US011368555B2

United States Patent
Pei et al.

(10) Patent No.: US 11,368,555 B2
(45) Date of Patent: Jun. 21, 2022

(54) CONVERT A DEVICE TO A CORRESPONDING DEVICE ACCORDING TO SEED IMAGE

(71) Applicant: Hewlett Packard Enterprise Development LP, Houston, TX (US)

(72) Inventors: Ji-kui Pei, Beijing (CN); Hao Lu, Fremont, CA (US); Chunfeng Wang, Beijing (CN); Yan Liu, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/040,087

(22) PCT Filed: Apr. 27, 2018

(86) PCT No.: PCT/CN2018/084921
§ 371 (c)(1),
(2) Date: Sep. 22, 2020

(87) PCT Pub. No.: WO2019/205106
PCT Pub. Date: Oct. 31, 2019

(65) Prior Publication Data
US 2021/0029222 A1 Jan. 28, 2021

(51) Int. Cl.
*H04L 29/08* (2006.01)
*H04L 12/24* (2006.01)
(Continued)

(52) U.S. Cl.
CPC ............... *H04L 67/34* (2013.01); *G06F 8/65* (2013.01); *G06F 9/4416* (2013.01);
(Continued)

(58) Field of Classification Search
CPC . G06F 8/65; G06F 9/441; G06F 9/445; G06F 9/4416; H04L 12/403;
(Continued)

(56) References Cited

U.S. PATENT DOCUMENTS 7,310,664 B1 * 12/2007 Merchant .............. H04W 24/02
709/220
7,542,572 B2  6/2009 Meier et al.
(Continued)

FOREIGN PATENT DOCUMENTS

WO  WO-2013036274  3/2013

OTHER PUBLICATIONS

International Searching Authority, The International Search Report and the Written Opinion, PCT/CN2018/084921, dated Jan. 17, 2019, 9 Pgs.
Lang, D.; "Introducing Single Image Sales, Updated Royalty Schedule"; Sep. 11, 2008; 5 pages.

*Primary Examiner* — Kostas J Katsikis
(74) *Attorney, Agent, or Firm* — Hewlett Packard Enterprise Patent Department

(57) ABSTRACT

The invention includes, in part, storing a seed image having instructions to communicate with devices of a predetermined device type, but not instructions to provision a network device to be fully operational in a network. A processor boots a network device in the network for a first time, detects if another network device exists in the network, and downloads a full version of a product image from the other network device. The full version of the product image uniquely corresponds to network devices deployed in the network that include at least one device of the predetermined device type, replaces the seed image with the full version of the product image, and provisions the network device to a particular device type of the network.

3 Claims, 7 Drawing Sheets

(51) Int. Cl.
*G06F 9/4401* (2018.01)
*G06F 8/65* (2018.01)
*H04L 67/00* (2022.01)
*H04L 41/0806* (2022.01)
*H04L 41/0813* (2022.01)
*H04W 84/12* (2009.01)
*H04W 88/08* (2009.01)

(52) U.S. Cl.
CPC ...... *H04L 41/0806* (2013.01); *H04L 41/0813* (2013.01); *H04W 84/12* (2013.01); *H04W 88/08* (2013.01)

(58) Field of Classification Search
CPC . H04L 12/2803; H04L 41/08; H04L 41/0806; H04L 41/0813; H04L 67/34; H04W 84/12; H04W 88/08
See application file for complete search history.

(56) References Cited

U.S. PATENT DOCUMENTS

| | | | |
|---|---|---|---|
| 7,865,713 | B2 | 1/2011 | Chesnutt et al. |
| 8,493,870 | B2* | 7/2013 | Calippe ............ H04L 41/12 370/242 |
| 2005/0059396 | A1* | 3/2005 | Chuah ............ H04W 24/02 455/435.1 |
| 2006/0114839 | A1* | 6/2006 | Meier ............ H04W 12/069 370/254 |
| 2006/0133332 | A1 | 6/2006 | Achanta |
| 2006/0203743 | A1 | 9/2006 | Quinn et al. |
| 2009/0119658 | A1* | 5/2009 | Thoon ............ H04L 41/08 717/173 |
| 2015/0085745 | A1* | 3/2015 | Atreya ............ H04W 16/18 370/328 |
| 2016/0212174 | A1* | 7/2016 | Raleigh ............ H04M 15/58 |

\* cited by examiner

CONVERT A DEVICE TO A CORRESPONDING DEVICE ACCORDING TO SEED IMAGE

BACKGROUND

Before a device (e.g., a wireless device or a wired device) is released to a customer, a corresponding software and/or firmware, such as a built-in operating system image may be installed into the device, so that when the device is put into use, the device can function appropriately to perform a plurality of intended corresponding operations.

BRIEF SUMMARY OF THE INVENTION

The invention generally relates to converting devices according to seed images.

DETAILED DESCRIPTION

Figure 1:
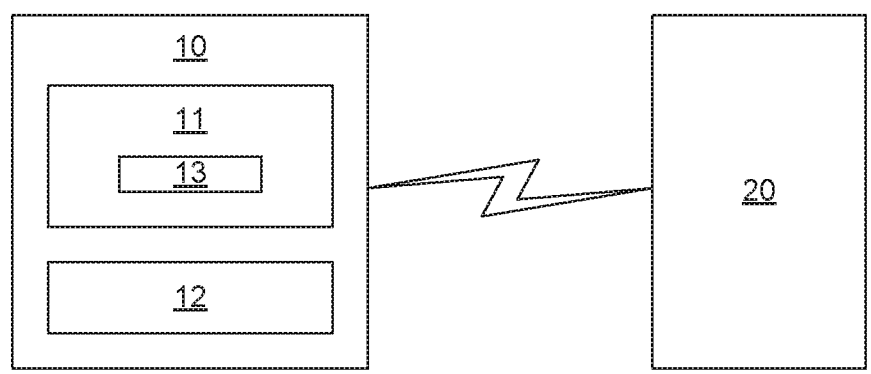
FIG. 1 is a block diagram illustrating an example wireless local area network (WLAN) including a device capable of converting devices according to seed images according to the present disclosure.

As used herein; software installed in a device for controlling the device to perform a plurality of intended corresponding operations may be referred to as a product image. Full version of the product image (i.e.; software) can provision the device to be fully operational in a network environment. In an access point (AP) software release, the AP devices may not be delivered to customer until a full version of the software (i.e., product image) for the AP is released. This may cause delays in release especially for AP vendors since they may need to obtain additional industry or government certifications per the wireless networking regulations.

Furthermore, some AP vendors may have different types of products. For example, an AP vendor may have two types of AP products: controller-based AP products and non-controller-based AP products. Each type of the product may have its dedicated product image. In some examples, the vendors may need to maintain different product image for different products. For example, when a vendor owns both controller-based AP products and non-controller-based AP products, it may need to maintain two different product images for these two types of products. Accordingly, the APs are delivered to customers after the version of product images are ready and installed onto the devices.

In the examples herein; the devices regardless of product types may be installed with a unified seed image and delivered to customers prior to the release of full version of product images. The unified seed image may be used for different types of products. The unified seed image may be a simplified product image with a reduced set of functionalities. The unified seed image may include instructions to communicate with devices of a predetermined device type, and may exclude instructions to provision a network device installed with the unified seed image to be fully operational in a network environment. The unified seed image does not need any update; hence; it is ready for immediate installation on the devices. The device installed with the unified seed image may read instructions from the unified seed image, boot the device in the network environment for a first time communicate with devices of a predetermined device type according to the read instructions, and detect if other network device of the predetermined device type exists in the network environment.

The unified seed image may be used to convert the AP devices to the devices of a predetermined device type. When the devices installed with the unified seed image are delivered to a customer and are integrated into the customers network environment, they may be converted to the devices of a predetermined device type installed with a full version of product image (e.g. a controller-based AP or a non-controller-based AP) based on the network environment, network and/or device configurations, etc. The conversion to the devices of a predetermined device type installed with the full version of the product image may be done automatically or manually by a network administrator. The device installed with the unified seed image may be a wireless AP or other types of wireless device.

In one example, a first network device comprises a memory to store a unified seed image, wherein the seed image includes instructions to communicate with devices of a predetermined device type, and wherein the seed image excludes instructions to provision the first network device to be fully operational in a network environment; and the device comprises a processor to boot the first network device in the network environment for a first time, to detect if a second network device of the predetermined device type exists in the network environment, to download a full version of a product image from the second network device in response to the second network device of the predetermined device type existing in the network environment, wherein the full version of the product image uniquely corresponds to network devices deployed in the network environment that includes at least one device of the predetermined device type, to replace the seed image with the full version of the product image, and to provision the first network device to a particular device type corresponding to the network environment that includes the at least one device of the predetermined device type using the full version of the product image.

In another example, a method comprising storing, by a memory of a first network device, a seed image, wherein the seed image includes instructions to communicate with devices of a predetermined device type, and wherein the seed image excludes instructions to provision the first network device to be fully operational in a network environment; booting; by a processor of the first network device, the first network device in the network environment for a first time; detecting, by the processor, if a second network device of the predetermined device type exists in the network environment; downloading, by the processor, a full version of a product image from the second network device in response to the second network device of the predetermined device type existing in the network environment, wherein the full version of the product image uniquely corresponds to network devices deployed in the network environment that includes at least one device of the predetermined device type; replacing, by the processor, the seed image with the full version of the product image; and provisioning, by the processor, the first network device to a particular device type corresponding to the network environment that includes the at least one device of the predetermined device type using the full version of the product image.

In another example, a non-transitory computer readable storage medium storing a seed image, wherein the seed image includes instructions to communicate with devices of a predetermined device type, and wherein the seed image excludes instructions to provision a first network device to be fully operational in a network environment; and the non-transitory computer readable storage medium storing instructions that, when executed by a processor of the first work device, causes the processor to boot the first network device in the network environment for a first time, to detect if a second network device of the predetermined device type exists in the network environment, to download a full version of a product image from the second network device in response to the second network device of the predetermined device type existing in the network environment, wherein the full version of the product image uniquely corresponds to network devices deployed in the network environment that includes at least one device of the predetermined device type, to replace the seed image with the full version of the product image, and to provision the first network device to a particular device type corresponding to the network environment that includes the at least one device of the predetermined device type using the full version of the product image.

As used herein, a "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. As used herein, an "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

It is appreciated that examples described herein below may include various components and features. Some of the components and features may be removed and/or modified without departing from a scope of the device, method and non-transitory computer readable storage medium for establish a new source routing tree for each gateway in a mesh network.

It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example. As used herein, a component is a combination of hardware and software executing on that hardware to provide a given functionality.

FIG. 1 is a block diagram illustrating an example \A/LAN including a device capable of converting devices according to seed images according to the present disclosure. Referring to FIG. 1, a WLAN includes a device 10 and at least one other network device 20. The device 10 may be a wireless or wired device, such as an AP, a controller, a branch gateway, a network switch, a router, etc The device 10 may include a memory 11 capable of storing a unified seed image 13. The unified seed image 13 can be a simplified product image with a reduced set of functionalities. For example, the unified seed image 13 may include instructions to communicate with devices of a predetermined device type, and may exclude instructions to provision a network device installed with the unified seed image 13 to be fully operational in a network environment.

The device 10 may include a processor 12 capable of converting the device to a corresponding device according to the unified seed image 13 stored in the memory 11. The processor 12 may be a hardware component and may execute instructions of a software component.

The processor 12 may detect if there is any other network device 20 in the network environment where the device 10 is located according to the unified seed image 13 when the device 10 is booted in the network environment for a first time. The network device 20 may be a controller-based AP, a non-controller-based AP, a cloud server or a local server, etc.

For example, when the device 10 is delivered to a customer and booted up in the customer's network environment for the first time, the device 10 may read the unified seed image 13 from the memory 11. The unified seed image 13 includes instructions that, when executed by the processor 12, causes the processor 12 to boot the device 10 in the network environment for a first time, and detect if other network device 20 of the predetermined device type exists in the network environment.

After the devices installed with the unified seed image are delivered to a customer, a full version of the product image of various network devices of the predetermined device type may be released and uploaded to a cloud server and/or a local server, so that the device installed with the unified seed image may download the corresponding full version of the product image from the cloud server or the local server. After the device installed with the unified seed image is converted to a network device of the predetermined device type and starts working normally, the converted network device also stores the full version of the product image. Therefore, other devices installed with a unified seed image may download the full version of the product image from the converted network device. Therefore, when network device 20 of the predetermined device type exists in the network environment, the processor 12 may download the full version of the product image from the network device 20 and convert the device 10 into the network device 20 of a predetermined device type.

For example, the processor 12 may detect if a controller-based AP exists in the network environment. For example, the processor 12 may access a Dynamic Host Configuration Protocol (DHCP) server and determine from the DHCP information of the DHCP server if a controller-based AP exists in the network environment where the device 10 is located. If there is information of the controller-based AP in the DHCP information of the DHCP server, the processor 12 may determine that the controller-based AP exists in the network environment; otherwise, the processor 12 may determine that there is no controller-based AP in the network environment.

For another example, the processor 12 may access a Domain Name Server (DNS) to parse the domain name in the DNS to determine if a controller-based AP exists in the network environment where the device 10 is located. If there is information of the controller-based AP in the domain name in the DNS, the processor 12 may determine that the controller-based AP exists in the network environment; otherwise; the processor 12 may determine that there is no controller-based AP in the network environment.

For another example, the processor 12 may access the cloud server and find out from the cloud server if a controller-based AP exists in the network environment where the device 10 is located. If the information of the controller-based AP is found in the cloud server, the processor 12 may determine that the controller-based AP exists in the network environment; otherwise, the processor 12 may determine that there is no controller-based AP in the network environment.

If a controller-based AP exists in the network environment, since the controller-based AP is operating normally in the network environment, a full version of the product image is installed in the controller-based AP. Therefore, the processor 12 may download the full version of the product image from the controller-based AP, replace the unified seed image with the full version of the product image, and convert the device 10 to a controller-based AP.

If no controller-based AP exists in the network environment, the processor 12 may detect if a non-controller-based AP exists in the network environment. For example, since the non-controller-based AP will periodically broadcast its information during normal operation, the processor 12 may determine if a non-controller-based AP exists in the network environment based on whether broadcast information from non-controller-based APs is received. If broadcast information from a non-controller-based AP is received within a predetermined time period, the processor 12 may determine that the non-controller based AP exists in the network environment; if it fails to receive broadcast information from a non-controller-based AP within the predetermined time period, the processor 12 may determine that there is no non-controller-based AP in the network environment.

If a non-controller-based AP exists in the network environment, since the non-controller-based AP is operating normally in the network environment, a full version of the product image is installed in the non-controller-based AP. Therefore, the processor 12 may download the full version of the product image from the non-controller-based AP, replace the unified seed image with the full version of the product image, and convert the device 10 to a non-controller-based AP.

If the controller-based AP and the non-controller-based AP do not exist in the network environment, the processor 12 may detect if a specified cloud server exists in the network environment. For example, the processor 12 may send an access request to the specified cloud server according to the predetermined network address, and determine if the specified cloud server exists in the network environment based on whether a response message from the specified cloud server corresponding to the access request is received. If a response message from the specified cloud server is received within the predetermined time period, the processor 12 may determine that the specified cloud server exists in the network environment; if it fails to receive response message from the specified cloud server within a predetermined time period, the processor 12 may determine that there is no specified cloud server in the network environment.

If a specified cloud server exists in the network environment, the processor 12 may access the specified cloud server, and check whether a configuration rule corresponding to the device 10 is stored in the cloud server. If a configuration rule corresponding to the device 10 is stored in the cloud server, the processor 12 may download the corresponding full version of the product image from the cloud server according to the configuration rule, and convert the device 10 to the devices of a predetermined device type (for example, a controller-based AP or a non-controller-based AP) according to the downloaded full version of the product image.

For another example, some configuration rules may be stored in the cloud server. The configuration rules are configured in the cloud server for these APs for a particular customer.

If the controller-based AP, the non-controller-based AP and the specified cloud server do not exist in the network environment, the processor 12 may detect if a specified local server exists in the network environment. For example, the processor 12 may send an access request to the specified local server according to the predetermined address, and determine if the specified local server exists in the network environment based on whether a response message from the specified local server corresponding to the access request is received. If a response message from the specified local server is received within the predetermined time period, the processor 12 may determine that the specified local server exists in the network environment; if it fails to receive response message from the specified local server within a predetermined time period, the processor 12 may determine that there is no specified local server in the network environment.

If a specified local server exists in the network environment, since the full version of the product image is pre-stored in the specified local server, the processor 12 may access the specified local server and download the full version of the product image from the specified local server, and convert the device 10 to the devices of a predetermined device type (for example, a controller-based AP or a non-controller-based AP) according to the downloaded full version of the product image.

For another example, the local server may be a Personal Digital Assistant (FDA), a portable personal computer, an AIO (all-in-one) computing device, a notebook, a convertible or hybrid notebook, a netbook, a tablet, a cellular device, a desktop computer, a multimedia player, a data communication device, a portable reading device, or any other device capable of storing the full version of the product image.

Figure 2:
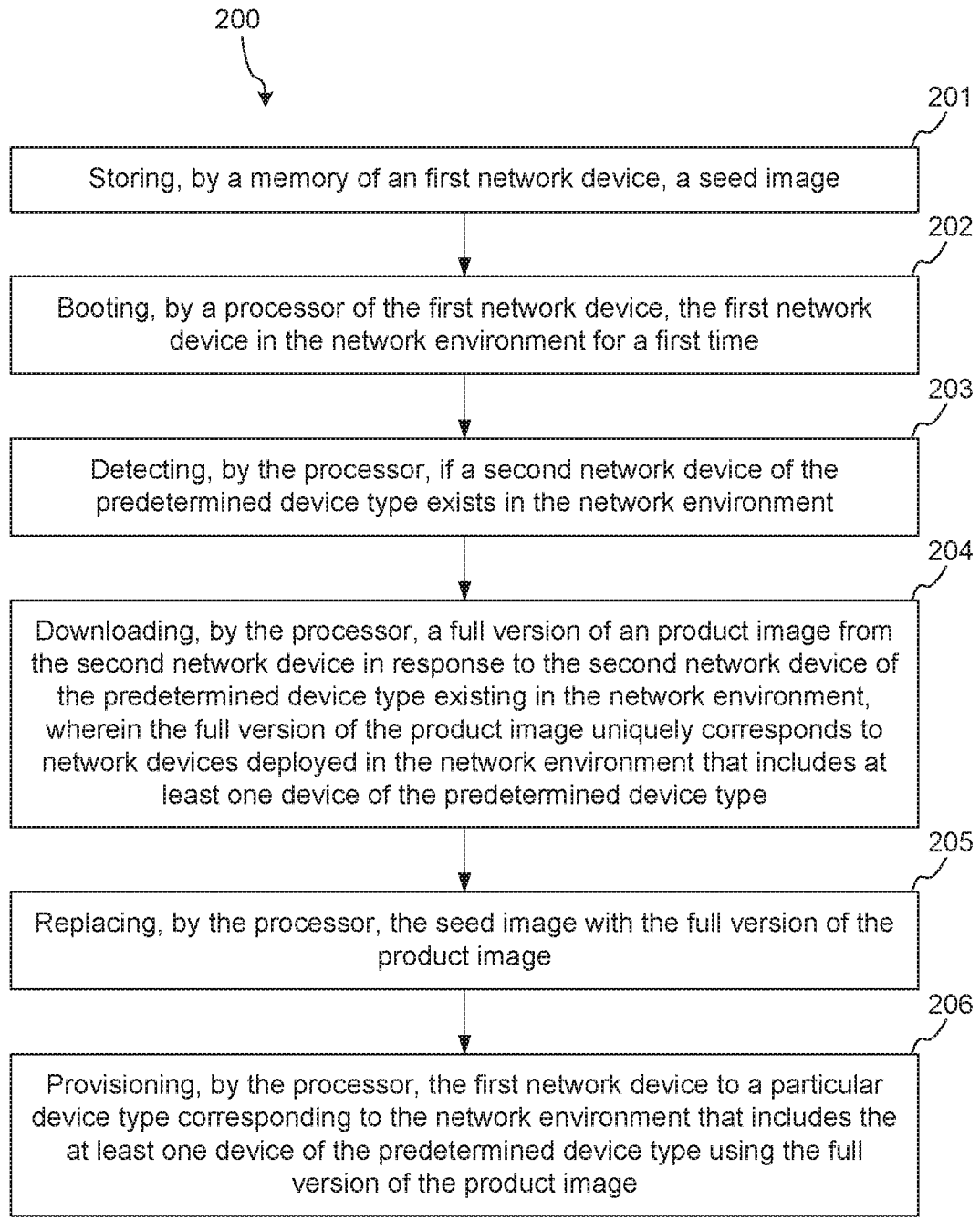
FIG. 2 is a flow chart illustrating an example method for converting devices according to seed images according to present disclosure.

FIG. 2 is a flow chart illustrating an example method for converting devices according to seed images according to present disclosure.

Referring to FIG. 2: A method 200 comprises: storing, by a memory of an first network device, a seed image, wherein the seed image includes instructions to communicate with devices of a predetermined device type, and wherein the seed image excludes instructions to provision the first network device to be fully operational in a network environment, at 201.

The method 200 further comprises booting, by a processor of the first network device, the first network device in the network environment for a first time, at 202.

The method 200 further comprises detecting, by the processor, if a second network device of the predetermined device type exists in the network environment, at 203. In an example, a WLAN may include a device and at least one other network device. The device may be a wireless or wired device, such as an AP, a controller, a branch gateway, a network switch, a router, etc.

The method 200 further comprises downloading, by the processor, a full version of a product image from the second network device in response to the second network device of the predetermined device type existing in the network environment, wherein the full version of the product image uniquely corresponds to network devices deployed in the network environment that includes at least one device of the predetermined device type, at 204.

The method 200 further comprises replacing, by the processor, the seed image with the full version of the product image, at 205.

The method 200 further comprises provisioning, by the processor, the first network device to a particular device type corresponding to the network environment that includes the at least one device of the predetermined device type using the full version of the product image, at 206.

For example, when the first network device comprises an AP and the second network device comprises a network controller, the method 200 further comprises provisioning, by the processor, the first network device to a controller-based AP in response to the AP detecting that the network controller exists in the network environment. As an example, the second network device comprising a network controller may be a controller-based AP.

For another example, when the first network device comprises an AP and the second network device comprises a virtual network management platform, the method 200 further comprises provisioning, by the processor, the first network device to a non-controller-based AP in response to the AP detecting that no network controller exists in the network environment. As an example, the second network device comprising a virtual network management platform may be a non-controller-based AP.

For another example, when the first network device comprises an AP and the second network device comprises a cloud service platform, the method 200 further comprises provisioning, by the processor, the first network device to a devices of a predetermined device type based on a full version of a product image corresponding to the configuration rules in the cloud service platform in response to the AP detecting that the controller-based AP and the non-controller-based AP do not exist in the network environment. As an example, the cloud service platform may be a cloud server.

For another example, when the first network device comprises an AP and the second network device comprises a local service platform, the method 200 further comprises provisioning, by the processor, provision the first network device to a devices of a predetermined device type based on the full version of a product image in the local service platform in response to the AP detecting that the controller-based AP, the non-controller-based AP and the specified cloud server do not exist in the network environment. As an example, the local service platform may be a local server.

Figure 3:
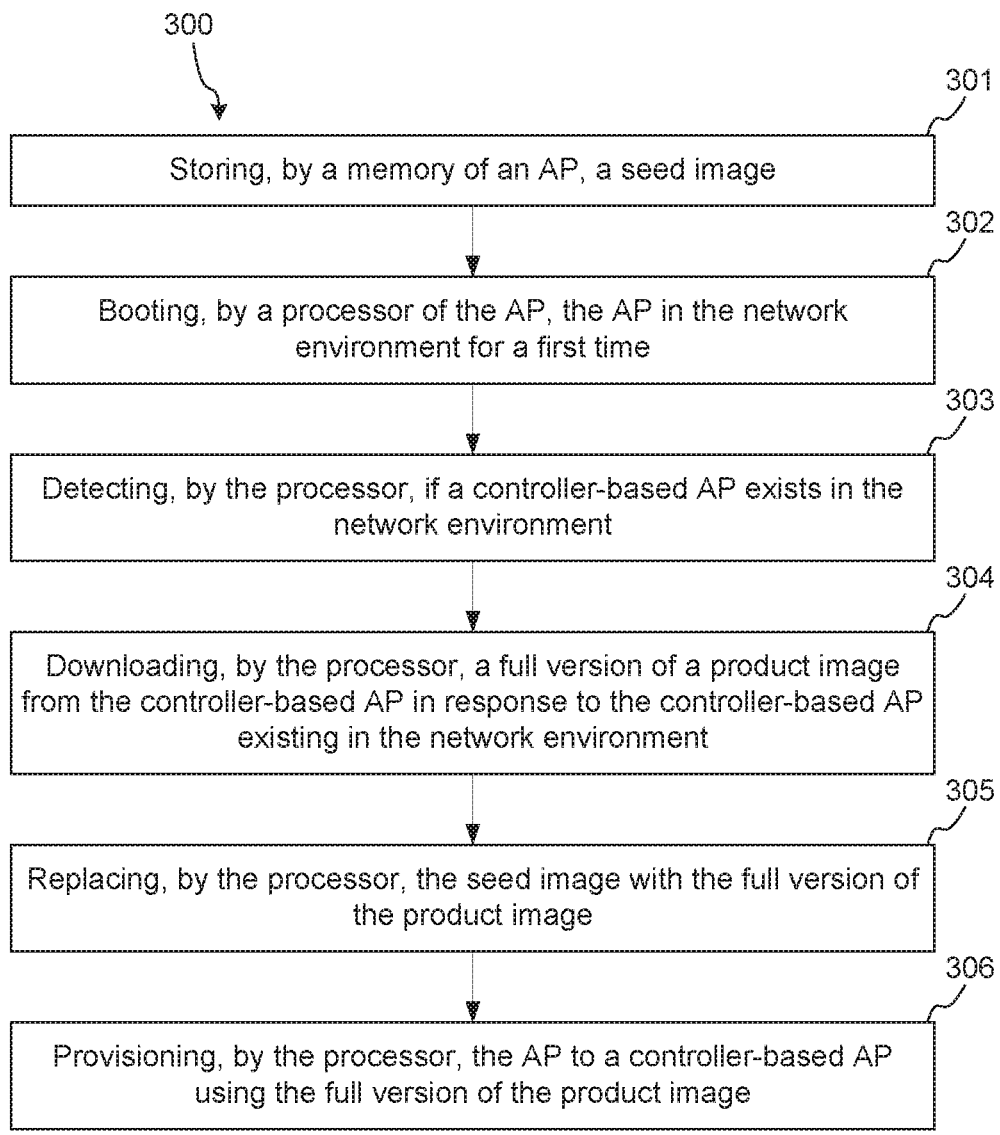
FIG. 3 is a flow chart illustrating another example method for converting devices according to seed images according to present disclosure.

FIG. 3 is a flow chart illustrating another example method for converting devices according to seed images according to present disclosure.

Referring to FIG. 3: A method 300 comprises: storing, by a memory of an AP, a seed image, wherein the seed image includes instructions to communicate with devices of a predetermined device type, and wherein the seed image excludes instructions to provision the AP to be fully operational in a network environment, at 301.

The method 300 further comprises booting, by a processor of the AP, the AP in the network environment for a first time, at 302.

The method 300 further comprises detecting, by the processor, if a controller-based AP exists in the network environment, at 303.

The method 300 further comprises downloading, by the processor, a full version of a product image from the controller-based AP in response to the controller-based AP existing in the network environment, at 304.

The method 300 further comprises replacing, by the processor, the seed image with the full version of the product image, at 305.

The method 300 further comprises provisioning, by the processor, the AP to a controller-based AP using the full version of the product image, at 306.

Figure 4:
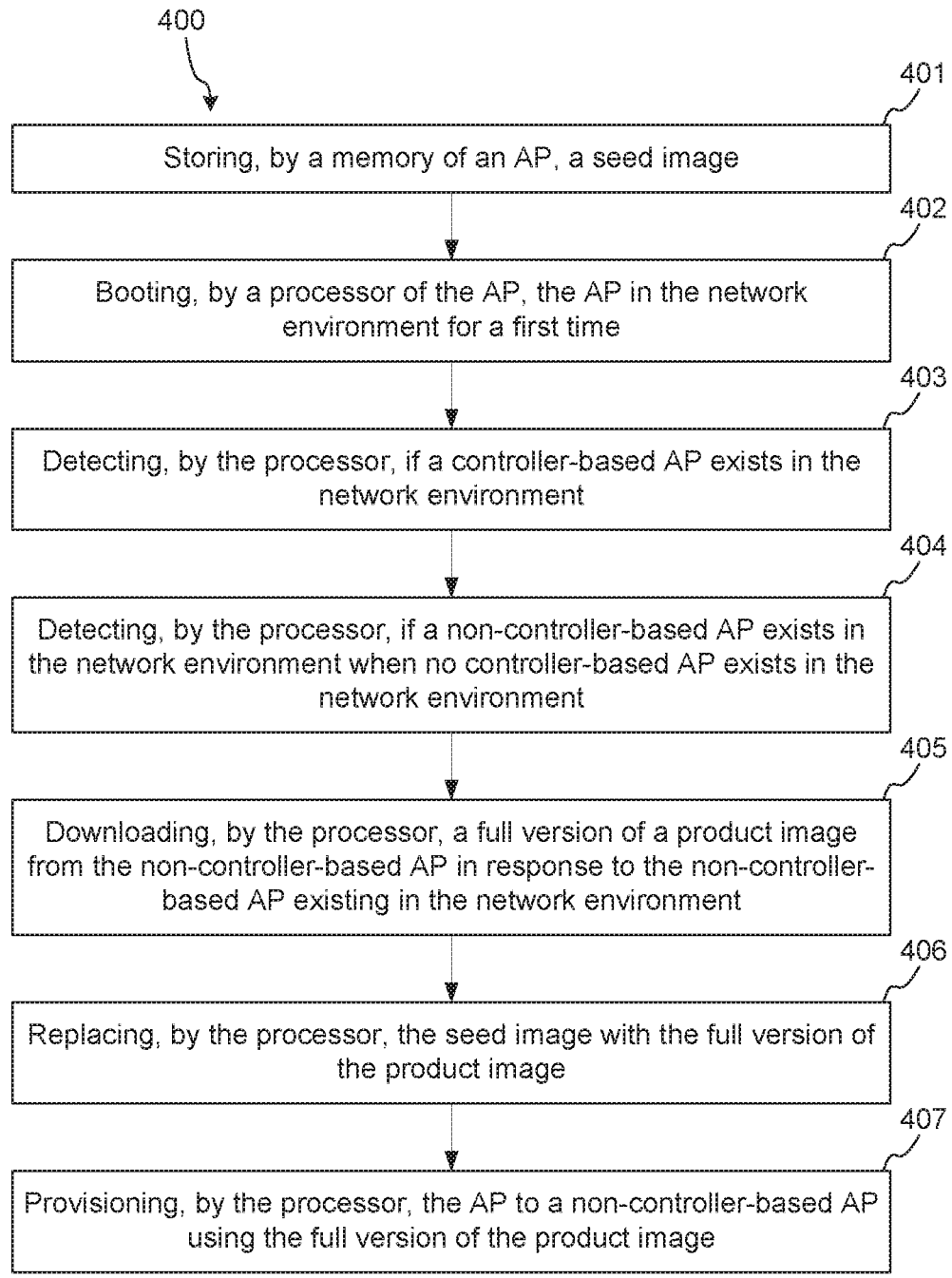
FIG. 4 is a flow chart illustrating another example method for converting devices according to seed images according to present disclosure.

FIG. 4 is a flow chart illustrating another example method for converting devices according to seed images according to present disclosure.

Referring to FIG. 4: A method 400 comprises: storing, by a memory of an AP, a seed image, wherein the seed image includes instructions to communicate with devices of a predetermined device type, and wherein the seed image excludes instructions to provision the AP to be fully operational in a network environment, at 401.

The method 400 further comprises booting, by a processor of the AP, the AP in the network environment for a first time, at 402.

The method 400 further comprises detecting, by the processor, if a controller-based AP exists in the network environment, at 403.

The method 400 further comprises: detecting, by the processor, if a non-controller-based AP exists in the network environment when no controller-based AP exists in the network environment, at 404.

The method 400 further comprises downloading, by the processor, a full version of a product image from the non-controller-based AP in response to the non-controller-based AP existing in the network environment, at 405.

The method 400 further comprises replacing, by the processor, the seed image with the full version of the product image, at 406.

The method 400 further comprises provisioning, by the processor, the AP to a non-controller-based AP using the full version of the product image, at 407.

Figure 5:
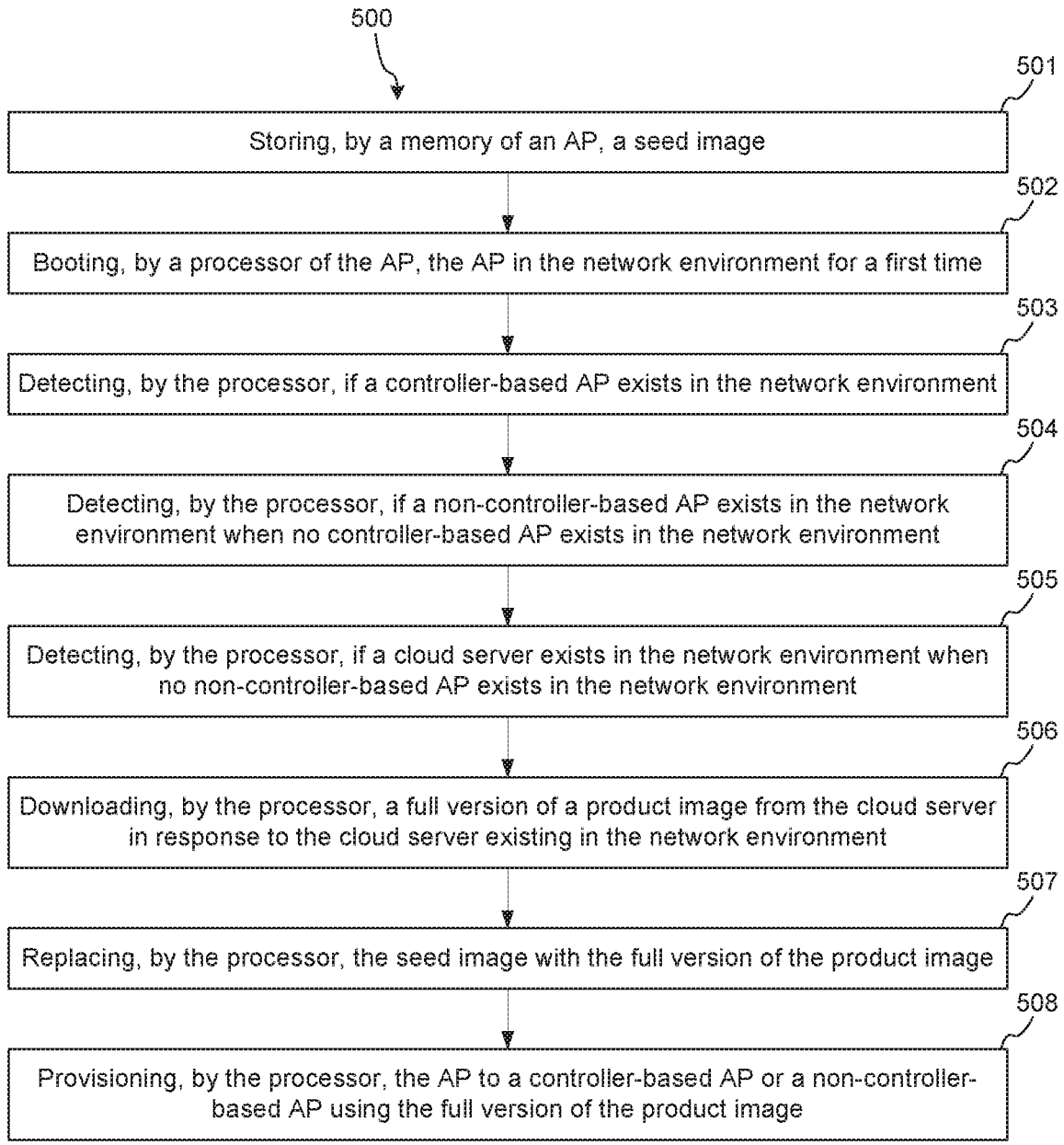
FIG. 5 is a flow chart illustrating another example method for converting devices according to seed images according to present disclosure.

FIG. 5 is a flow chart illustrating another example method for converting devices according to seed images according to present disclosure.

Referring to FIG. 5: A method 500 comprises: storing, by a memory of an AP, a seed image, wherein the seed image includes instructions to communicate with devices of a predetermined device type, and wherein the seed image excludes instructions to provision the AP to be fully operational in a network environment, at 501.

The method 500 further comprises booting, by a processor of the AP, the AP in the network environment for a first time, at 502.

The method 500 further comprises detecting, by the processor, if a controller-based AP exists in the network environment, at 503.

The method 500 further comprises: detecting, by the processor, if a non-controller-based AP exists in the network environment when no controller-based AP exists in the network environment, at 504.

The method 500 further comprises: detecting, by the processor, if a cloud server exists in the network environment when no non-controller-based AP exists in the network environment, at 505.

The method 500 further comprises downloading, by the processor, a full version of a product image from the cloud server in response to the cloud server existing in the network environment, at 506.

The method 500 further comprises replacing, by the processor, the seed image with the full version of the product image, at 507.

The method 500 further comprises provisioning, by the processor, the AP to a controller-based AP or a non-controller-based AP using the full version of the product image, at 508.

Further, some configuration rules may be stored in the cloud server. The configuration rules are configured in the cloud server for these APs for a particular customer. When the cloud server is detected, the processor may detect whether a configuration rule associated to the device are stored in the cloud server. If a configuration rule associated with the device is stored in the cloud server, the processor may download the corresponding full version of the product image according to the configuration rule. Then, the device may be convert to a controller-based AP or a non-controller-based AP based on the downloaded full version of the product image.

Figure 6:
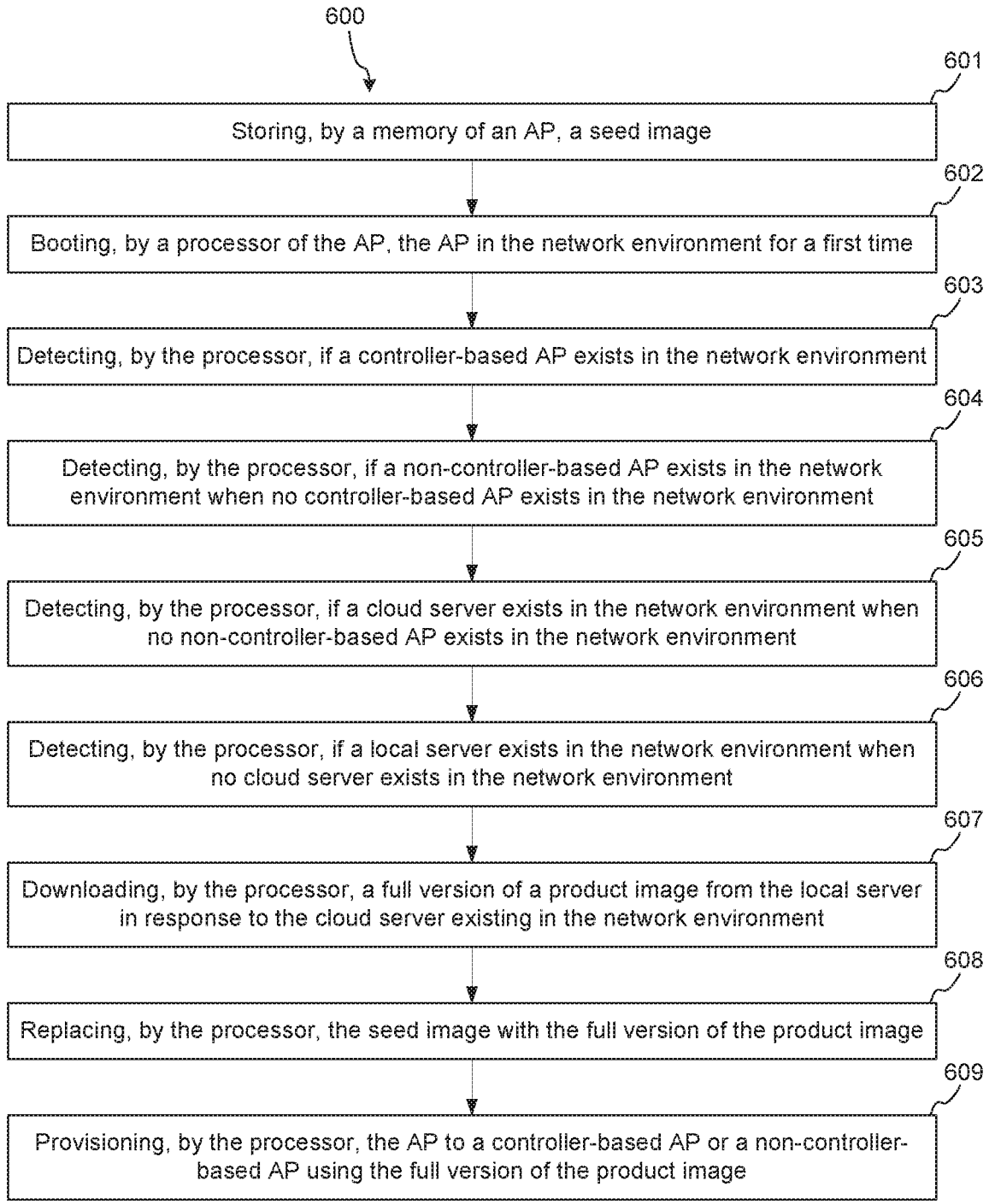
FIG. 6 is a flow chart illustrating another example method for converting devices according to seed images according to present disclosure.

FIG. 6 is a flow chart illustrating another example method for converting devices according to seed images according to present disclosure.

Referring to FIG. 6: A method 600 comprises: storing, by a memory of an AP, a seed image, wherein the seed image includes instructions to communicate with devices of a predetermined device type, and wherein the seed image excludes instructions to provision the AP to be fully operational in a network environment, at 601.

The method 600 further comprises booting, by a processor of the AP, the AP in the network environment for a first time, at 602.

The method 600 further comprises detecting, by the processor, if a controller-based AP exists in the network environment, at 603.

The method 600 further comprises: detecting, by the processor, if a non-controller-based AP exists in the network environment when no controller-based AP exists in the network environment, at 604.

The method 600 further comprises: detecting, by the processor, if a cloud server exists in the network environment when no non-controller-based AP exists in the network environment, at 605.

The method 600 further comprises: detecting, by the processor, if a local server exists in the network environment when no cloud server exists in the network environment, at 606.

The method 600 further comprises downloading, by the processor, a full version of a product image from the local server in response to the local server existing in the network environment, at 607.

The method 600 further comprises replacing, by the processor, the seed image with the full version of the product image, at 608.

The method 600 further comprises provisioning, by the processor, the AP to a controller-based AP or a non-controller-based AP using the full version of the product image, at 609.

Further, a full version of the product image may be stored in the local server. When the local server is detected, the processor may download the full version of the product image. Then, the device may be convert to a controller-based AP or a non-controller-based AP based on the downloaded full version of the product image.

Figure 7:
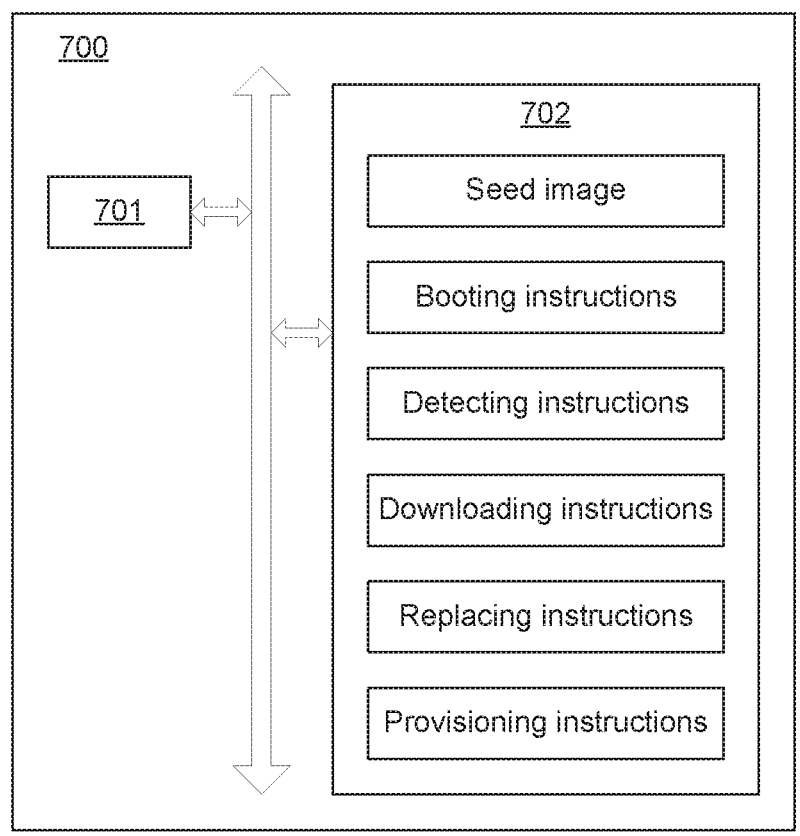
FIG. 7 is a block diagram illustrating example components for implementing the device shown in FIG. 1 according to present disclosure.

FIG. 7 is a block diagram illustrating example components for implementing the device shown in FIG. 1 according to present disclosure. The first network device 700 includes a processor 701 and and/or a non-transitory computer readable storage medium 702.

The non-transitory computer readable storage medium 702 stores a seed image and instructions executable for the possessor 701, wherein the seed image includes instructions to communicate with devices of a predetermined device type, and wherein the seed image excludes instructions to provision the first network device 700 to be fully operational in a network environment.

The instructions include booting instructions that, when executed by the processor 701, cause the processor 701 to boot the first network device 700 in the network environment for a first time.

The instructions include detecting instructions that, when executed by the processor 701, cause the processor 701 to detect if a second network device of the predetermined device type exists in the network environment.

The instructions include downloading instructions that, when executed by the processor 701, cause the processor 701 to download a full version of a product image from the second network device in response to the second network device of the predetermined device type existing in the network environment, wherein the full version of the product image uniquely corresponds to network devices deployed in the network environment that includes at least one device of the predetermined device type.

The instructions include replacing instructions that, when executed by the processor 701, cause the processor 701 to replace the seed image with the full version of the product image.

The instructions include provisioning instructions that, when executed by the processor 701, cause the processor 701 to provision the first network device 700 to a particular device type corresponding to the network environment that includes the at least one device of the predetermined device type using the full version of the product image.

While the present disclosure has been described in connection with certain exemplary embodiments, it is to be understood that the disclosure is not limited to the disclosed embodiments, but, on the contrary, is intended to cover various modifications and equivalent arrangements included within the spirit and scope of the appended claims, and equivalents thereof,

What is claimed is:

1. A method comprising:
storing, by a memory of a first network device, a seed image, wherein the seed image includes instructions to communicate with devices of a predetermined device type, and wherein the seed image excludes instructions to provision the first network device to be fully operational in a network environment;

booting, by a processor of the first network device, the first network device in the network environment for a first time;

detecting, by the processor, if a second network device of the predetermined device type exists in the network environment;

downloading, by the processor, a full version of a product image from the second network device in response to the second network device of the predetermined device type existing in the network environment, wherein the full version of the product image uniquely corresponds to network devices deployed in the network environment that includes at least one device of the predetermined device type;

replacing, by the processor, the seed image with the full version of the product image; and provisioning, by the processor, the first network device to a particular device type corresponding to the network environment that includes the at least one device of the predetermined device type using the full version of the product image, wherein the first network device comprises an access point and the second network device comprises a virtual network management platform, and wherein the first network device is provisioned to a non-controller based access point in response to the access point detecting that no network controller exists in the network environment.

2. A first network device comprising:

a memory to store a seed image, wherein the seed image includes instructions to communicate with devices of a predetermined device type, and wherein the seed image excludes instructions to provision the first network device to be fully operational in a network environment; and a processor to:

boot the first network device in the network environment for a first time;

detect if a second network device of the predetermined device type exists in the network environment;

download a full version of a product image from the second network device in response to the second network device of the predetermined device type existing in the network environment, wherein the full version of the product image uniquely corresponds to network devices deployed in the network environment that includes at least one device of the predetermined device type;

replace the seed image with the full version of the product image; and provision the first network device to a particular device type corresponding to the network environment that includes the at least one device of the predetermined device type using the full version of the product image, wherein the first network device comprises an access point and the second network device comprises a virtual network management platform, and wherein the first network device is provisioned to a non-controller based access point in response to the access point detecting that no network controller exists in the network environment.

3. A non-transitory computer readable storage medium storing a seed image, wherein the seed image includes instructions to communicate with devices of a predetermined device type, and wherein the seed image excludes instructions to provision a first network device to be fully operational in a network environment; and storing instructions that, when executed by a processor of the first device, causes the processor to:

boot the first network device in the network environment for a first time;

detect if a second network device of the predetermined device type exists in the network environment;

download a full version of a product image from the second network device in response to the second network device of the predetermined device type existing in the network environment, wherein the full version of the product image uniquely corresponds to network devices deployed in the network environment that includes at least one device of the predetermined device type;

replace the seed image with the full version of the product image; and provision the first network device to a particular device type corresponding to the network environment that includes the at least one device of the predetermined device type using the full version of the product image, wherein the first network device comprises an access point and the second network device comprises a virtual network management platform, and wherein the first network device is provisioned to a non-controller based access point in response to the access point detecting that no network controller exists in the network environment.

* * * * *